United States Patent [19]
Vilen et al.

[11] 3,871,725
[45] Mar. 18, 1975

[54] SELF LEVELING MECHANISM FOR TRAY CART

[75] Inventors: Erik O. Vilen, La Grange Park; Vytas Zygas, Cicero, both of Ill.

[73] Assignee: G. S. Blakeslee & Co., Cicero, Ill.

[22] Filed: Mar. 18, 1974

[21] Appl. No.: 451,985

[52] U.S. Cl. ................................................ 312/71
[51] Int. Cl. ............................................. A47f 1/06
[58] Field of Search ........... 221/226, 227, 232, 279; 312/71; 211/49 D

[56] References Cited
FOREIGN PATENTS OR APPLICATIONS
626,159   8/1961   Canada ............................ 211/49 D Primary Examiner—Stanley H. Tollberg
Attorney, Agent, or Firm—Johnson, Dienner, Emrich & Wagner

[57] ABSTRACT

The tray cart has main frame means including an upright mast, and a horizontal carrier supported for vertical movement in the upright mast. Spring units are secured between the main frame means and the opposed ends of a floating cross bar. Means for transmitting and reversing the direction of force between the carrier and the cross bar are carried by the upright mast, have connection with the carrier, and have connection with the cross bar adjustably lengthwise thereof.

4 Claims, 6 Drawing Figures 3,871,725

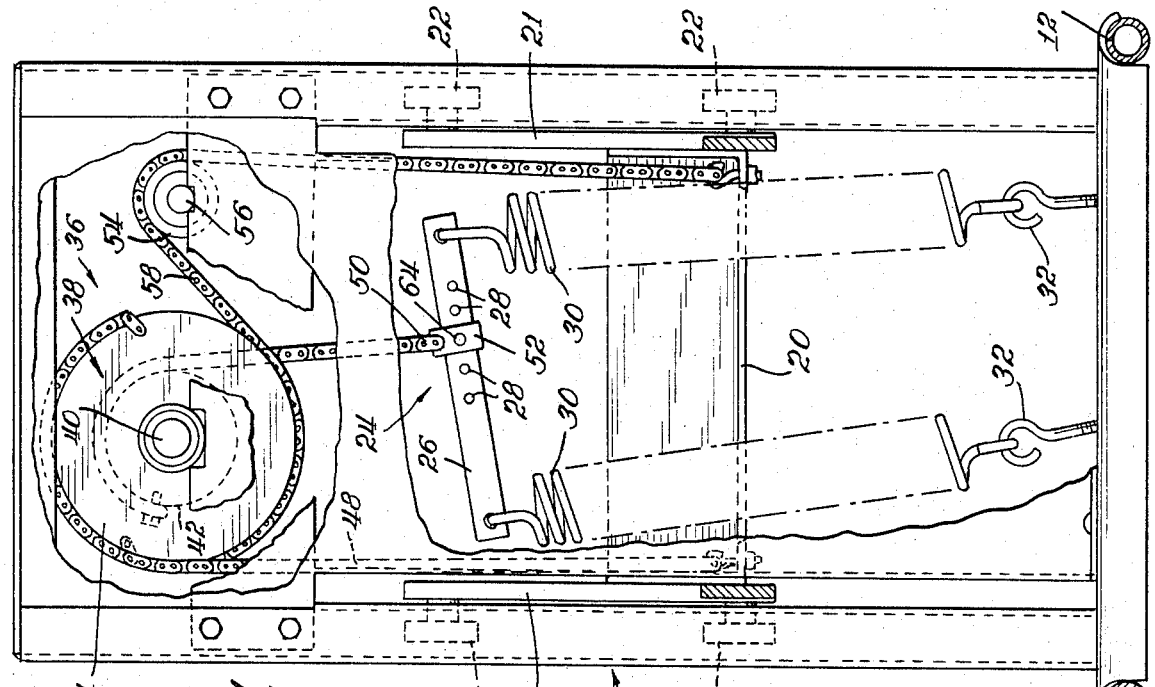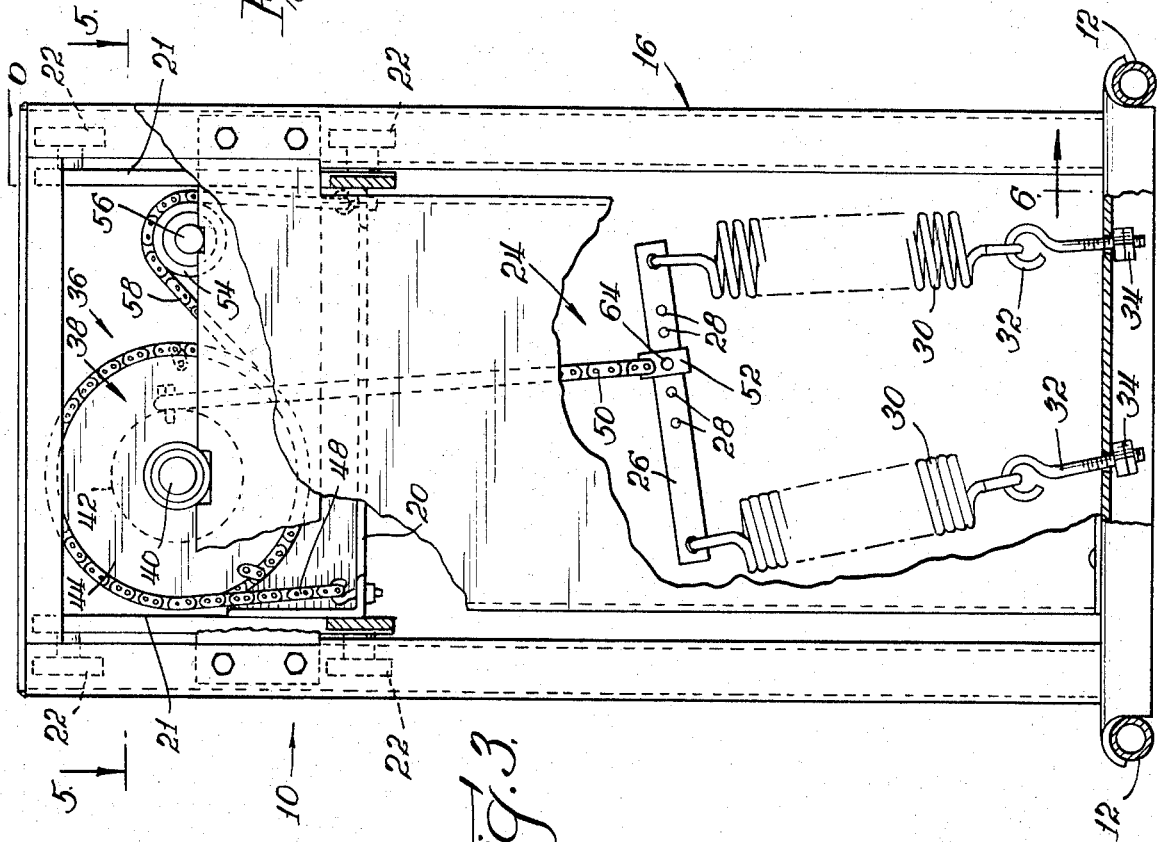

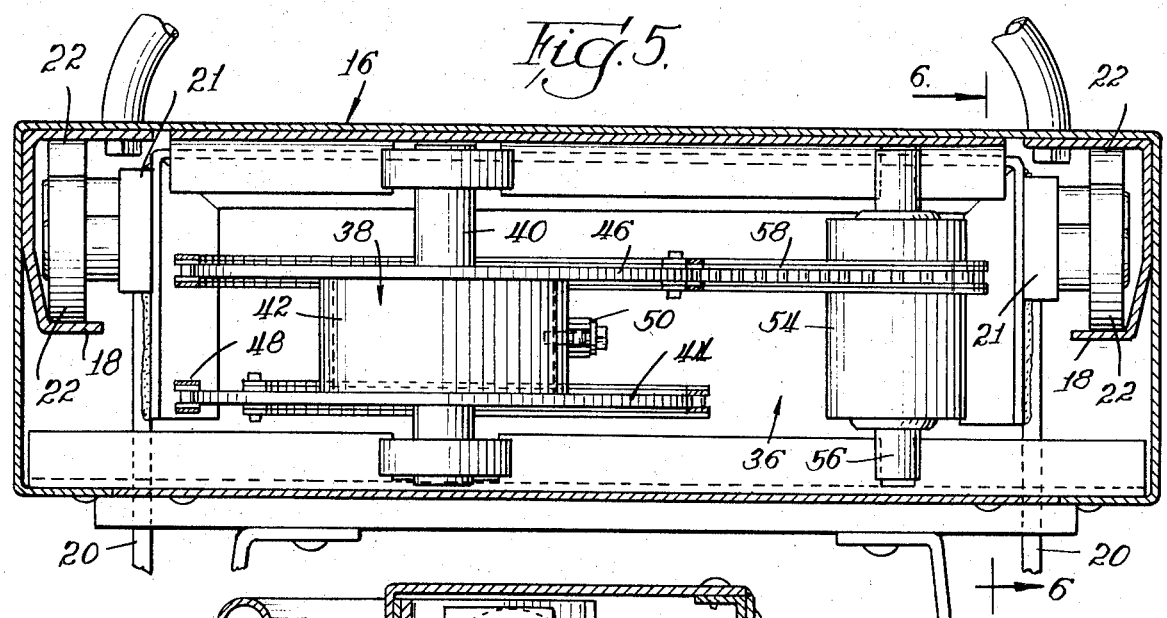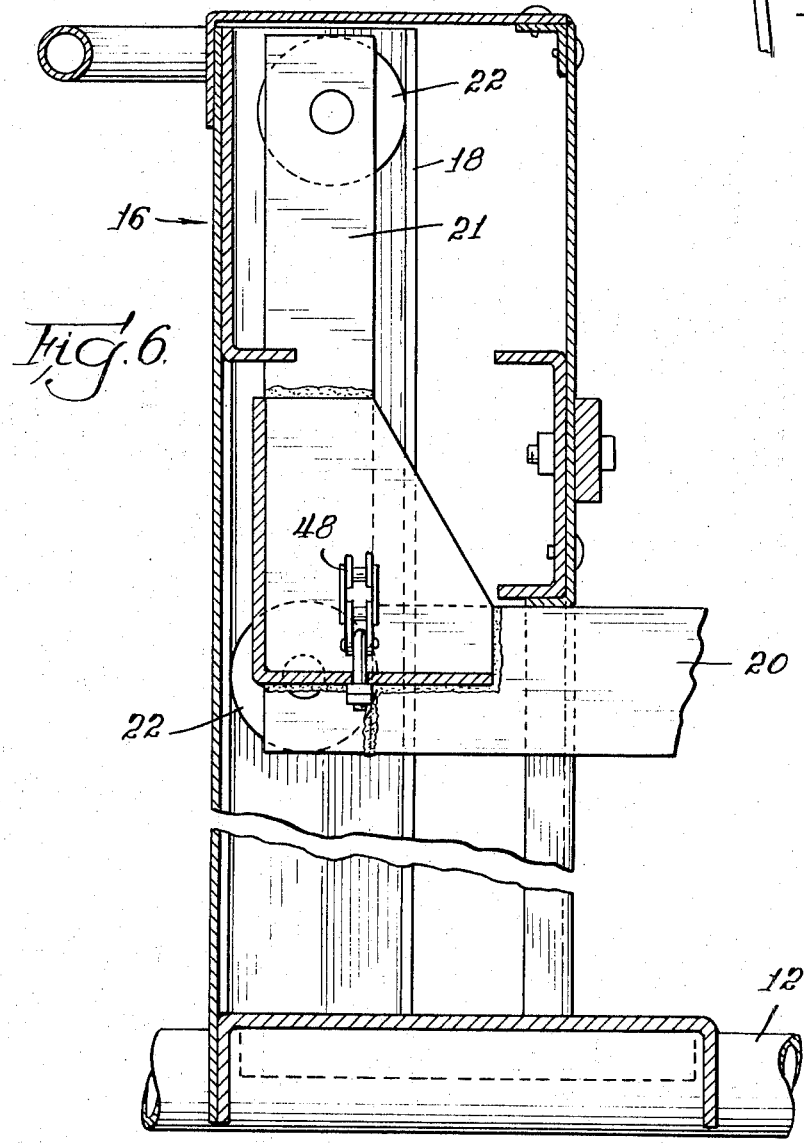

SELF LEVELING MECHANISM FOR TRAY CART

FIELD OF THE INVENTION

The present invention pertains generally to a mobile cart having a horizontal carrier on which food trays to be dispensed can be stacked, and more particularly to self leveling mechanism associated with the carrier for maintaining the top of the stack of trays at a substantially constant level regardless of the number of trays in the stack.

SUMMARY OF THE INVENTION

The self leveling mechanism of the present invention is adapted for use in a tray cart having main frame means including an upright mast, and a horizontal carrier supported for vertical movement in the upright mast.

The self leveling mechanism comprises a pair of laterally spaced upright spring units adjacent the lower end of the upright mast, which are secured at their lower ends to the main frame means, and which are secured at their upper ends to the opposed ends of a floating cross bar. Means for transmitting and reversing the direction of force between the carrier and the cross bar are carried by the upright mast adjacent the upper end thereof and have connection with the carrier. Connecting means connect the force transmitting means to the cross bar whereby the spring units impose a tension on the cross bar and the force transmitting means and thereby urge the carrier upwardly.

The force transmitting means provides a mechanical advantage between movement of the cross bar and the carrier, and the connecting means is adjustably positionable lengthwise of the cross bar for varying the effective tension of the pair of spring units.

BRIEF DESCRIPTION OF THE DRAWINGS

FIG. 3 is a front elevational view of the tray cart of FIG. 1 with portions thereof being broken away to better illustrate the self leveling mechanism of the present invention;

FIG. 4 is a view corresponding generally to FIG. 3, but shows the self leveling mechanism in a changed position;

FIG. 5 is a horizontal sectional view taken substantially along the line 5—5 in FIG. 3 looking in the direction indicated by the arrows; and FIG. 6 is a vertical sectional view taken substantially along the line 6—6 in FIG. 3 looking in the direction indicated by the arrows.

DESCRIPTION OF THE PREFERRED EMBODIMENT

Figure 1:
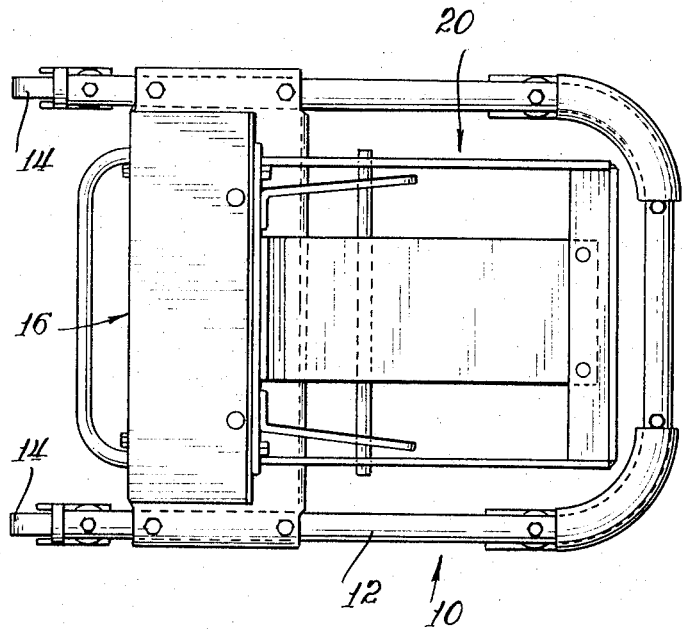
FIG. 1 is a plan view of a tray cart incorporating the principles of the present invention.
Figure 2:
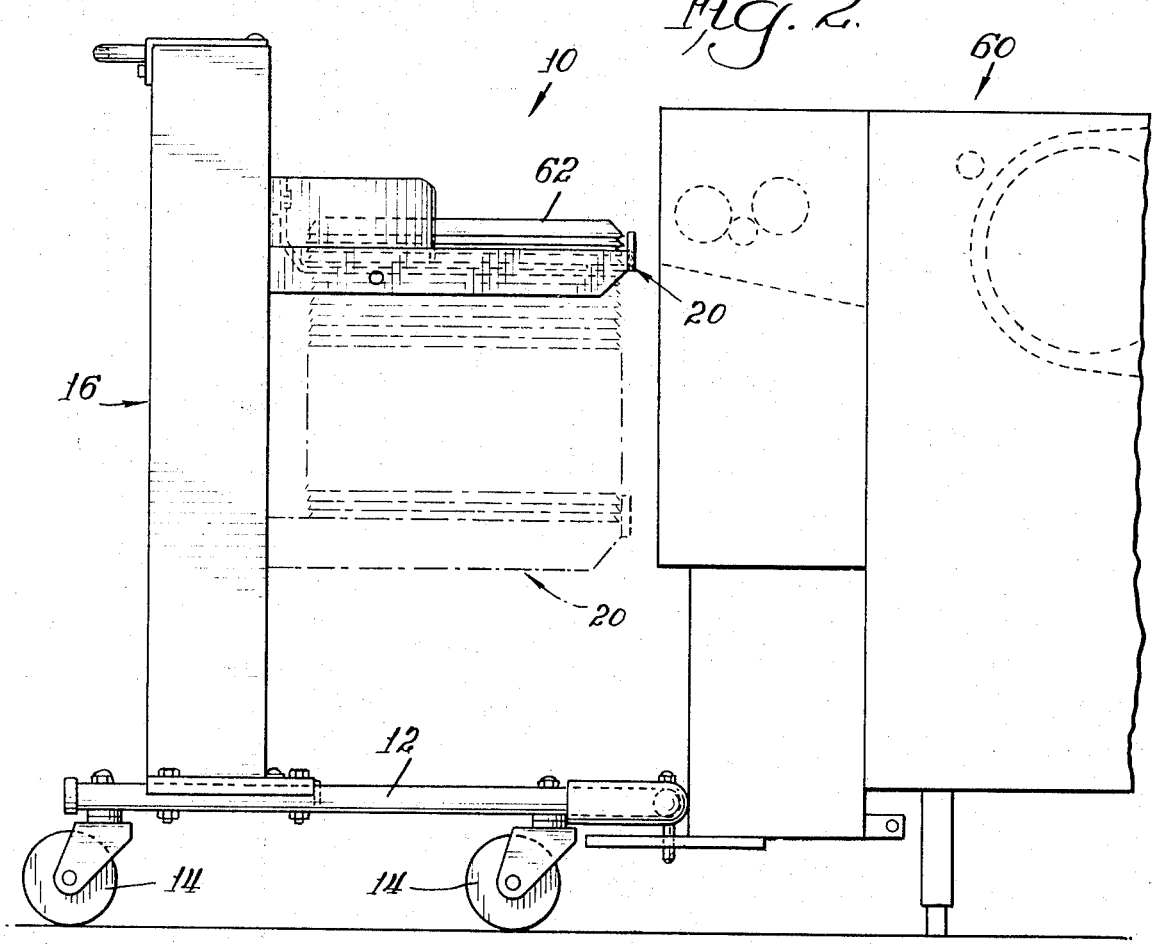
FIG. 2 is a side elevational view of the tray cart of FIG. 1 and of a portion of a commercial dishwashing machine.

Referring now to FIGS. 1-3, there is indicated generally by the reference numeral 10 a tray cart embodying the principles of the present invention.

The tray cart 10 comprises a main frame 12 supported on casters 14, an upright generally rectangular mast 16 which includes C-shaped inwardly facing side channels 18 (FIG. 5), and a horizontal carrier 20 having a back portion 21 which is vertically movable within the upright mast 16 by reason of rollers 22 engaged in the channels 18.

Embodied in the tray cart 10, as shown in FIGS. 3-6, is self leveling mechanism 24 for the carrier 20. The self leveling mechanism comprises a central floating cross bar 26 formed with a plurality of lengthwise spaced apertures 28. A pair of spring units or coil springs 30 are located adjacent the lower end of the upright mast 16. The coil springs 30 at their lower ends are adjustably anchored or secured by eye bolts 32 and nuts 34 to the lower section of the upright mast 16 and at their upper ends are engaged or secured in the opposed ends of the cross bar 26. Carried by the upright mast 16 adjacent the upper end thereof are means 36 for transmitting and reversing the direction of force between the carrier 20 and the cross bar 26.

The force transmitting means 36 comprises a pulley 38 secured to a shaft 40 journaled at its ends in the upright mast 16 on a horizontal axis. The pulley 38 includes a hub 42 and first and second side discs 44 and 46. A first flexible force transmitting element 48, in the form of a chain, is secured at its one end to one side of the carrier 20 and at its other end to the first disc 44, and is engageable with the periphery of the disc 44. A second flexible force transmitting element 50, in the form of a chain, is secured at its one end to a generally U-shaped connecting member 52 slidable along the cross bar 26 and at its other end to the hub 42, and is engageable with the periphery of the hub 42.

The force transmitting means 36 further comprises a drum 54 secured to a shaft 56 journaled at its ends in the upright mast 16 on an axis laterally spaced from and parallel to the axis of the pulley 38. A third flexible force transmitting element 58, in the form of a chain, is secured at its one end to the other side of the carrier 20 and at its other end to the second disc 46, and is engaged over the drum 54 and is engageable with the periphery of the second disc 46.

Functionally, the tray cart 10, as shown in FIG. 2, is adapted to be positioned at the discharge end of a commercial conveyor-type dishwashing machine 60, with the carrier 20 serving to move downwardly (e.g., from the solid line position to the dotted line position) and to receive in self-stacking formation washed food trays 62 as they leave the conveyor of the dishwasher 60. The tray cart 10 with a stack of trays 62 may then be moved to a convenient location where patrons of a cafeteria or the like may remove trays individually. As trays 62 are removed, the carrier 20 returns upwardly (e.g., from the dotted line position to the solid line position). The carrier 20 is urged upwardly by reason of the coil springs 30 which impose a tension on the cross bar 26 and the force transmitting means 36. The self leveling mechanism 24, during stacking and unstacking of trays 62, maintains the top of the stack of trays at a substantially constant level regardless of the number of trays in the stack.

Vertical movement of the carrier 20 is a function of the weight of the trays 62 stacked thereon. As will be appreciated, one series of trays will have a given unit weight, while another series of trays may have a different unit weight. To accommodate substantially equal increments of movement of the carrier 20 for each tray deposited on or removed from the carrier 20 regardless of what particular series of trays is in use, the connecting member 52 is adjustably positionable lengthwise of the cross bar 26 for varying the effective tension of the coil springs 30. A locating pin 64 is inserted through the connecting member 52 and one of the cross bar apertures 28 for positioning the connecting member 52 at a preselected point lengthwise of the cross bar 26.

In accordance with the principles of the present invention, the force transmitting means 36 provides a mechanical advantage between movement of the cross bar 26 and the carrier 20 in proportion to the ratio of the diameter of the pulley hub 42 and side discs 44 and 46, while the spring loaded cross bar 26 and the adjustable connecting member 52 permit variation of spring tensioning in relation to the unit weight of a series of trays for uniform or constant rate of carrier movement in response to changes in the number of trays on the carrier. Auxiliary variations of spring tension may be effected by adjustment of the nuts 34 on the eye bolts 32.

While there has been shown and described a preferred embodiment of the present invention, it will be understood by those skilled in the art that various rearrangements and modifications may be made therein without departing from the spirit and scope of the invention.

The invention claimed is:

1. For use in a tray cart having main frame means including an upright mast, and a horizontal carrier supported for vertical movement in the upright mast: self leveling mechanism for the carrier comprising a free-floating cross bar, a pair of laterally spaced upright spring units adjacent the lower end of the upright mast, said spring units being secured at their lower ends to the main frame means and at their upper ends to the opposed ends of said cross bar, means for transmitting and reversing the direction of force between the carrier and said cross bar, said force transmitting means being carried by the upright mast adjacent the upper end thereof and having connection with the carrier, means connecting said force transmitting means to said cross bar intermediate of the ends of the latter whereby said spring units impose a tension on said cross bar and said force transmitting means and thereby urge the carrier upwardly, and said connecting means being adjustably positionable lengthwise of said cross bar for varying the effective tension of said pair of spring units.

2. The self leveling mechanism of claim 1 wherein said cross bar is formed with a plurality of lengthwise spaced apertures, and including a locating pin inserted in one of said apertures for positioning said connecting means lengthwise of said cross bar.

3. The self leveling mechanism of claim 1 wherein said force transmitting means comprises a pulley with a hub and a side disc rotatably mounted in the upright mast on a horizontal axis, a first flexible force transmitting element secured at its one end to the carrier and at its other end to said disc and being engageable with the periphery of said disc, and a second flexible force transmitting element secured at its one end to said connecting means and at its other end to said hub and being engageable with the periphery of said hub.

4. The self leveling mechanism of claim 3 wherein said one end of said first flexible force transmitting element is secured to the carrier at one side thereof; wherein said pulley includes a second side disc; and wherein said force transmitting means further comprises a drum rotatably mounted in the upright mast on an axis laterally spaced from and parallel to said axis of said pulley, and a third flexible force transmitting element secured at its one end to the other side of the carrier and at its other end to said second disc and being engaged over said drum and being engageable with the periphery of said second disc.

* * * * *